United States Patent [19]
Bolender

[11] Patent Number: 5,829,474
[45] Date of Patent: Nov. 3, 1998

[54] TUBING PIERCING AND TAPPING APPARATUS

[75] Inventor: Klaus Bolender, Hagen, Germany

[73] Assignee: BKM Bolender-Kubitz Maschinenkonstruktion GmbH, Hagen, Germany

[21] Appl. No.: 832,983

[22] Filed: Apr. 4, 1997

[30] Foreign Application Priority Data

Apr. 5, 1996 [DE] Germany ............ 196 13 687.3

[51] Int. Cl.⁶ .......... F16K 43/00; B23B 41/08; F16L 41/06
[52] U.S. Cl. .......... 137/318; 30/94; 222/91; 251/86; 251/215; 285/197; 408/102; 408/111; 408/137
[58] Field of Search .......... 30/92, 93, 94; 137/318; 222/83, 91, 84; 251/84, 85, 86, 215; 285/197; 408/101, 102, 111, 137, 138

[56] References Cited

U.S. PATENT DOCUMENTS

| | | | |
|---|---|---|---|
| 1,763,927 | 6/1930 | Ireland | 251/86 |
| 2,664,313 | 12/1953 | Ono | 251/86 |
| 3,252,474 | 5/1966 | Ehrens et al. | 137/318 |
| 3,326,231 | 6/1967 | Hogg | 137/318 |
| 3,428,075 | 2/1969 | Wagner | 137/318 |
| 3,459,331 | 8/1969 | Hogg | 137/318 |
| 3,973,584 | 8/1976 | McKinnon et al. | 137/318 |
| 3,978,881 | 9/1976 | Mouranie | 137/318 |
| 4,018,246 | 4/1977 | Langstroth | 137/318 |
| 4,204,559 | 5/1980 | Wagner | 137/318 |
| 4,537,214 | 8/1985 | Cowan | 137/318 |
| 4,598,731 | 7/1986 | Colson | 137/318 |
| 4,611,624 | 9/1986 | Snyder | 137/318 |
| 4,955,406 | 9/1990 | Antoniello | 137/318 |
| 5,100,099 | 3/1992 | D'Agostino et al. | 251/86 |
| 5,353,831 | 10/1994 | Roth | 137/318 |

FOREIGN PATENT DOCUMENTS 1500245  3/1969  Germany .................. 251/86

*Primary Examiner*—George L. Walton
*Attorney, Agent, or Firm*—Herbert Dubno; Andrew Wilford

[57] ABSTRACT

An apparatus for piercing a hole in a tube centered on a tube axis has a plurality of housing parts one which is formed with a throughgoing threaded passage centered on a passage axis and both of which are secured the housing parts around the tube with the passage axis extending generally radially of the tube axis. A tool body threadable into the passage is formed with a blind bore generally centered on the passage axis, open radially inward of the tube axis toward the tube, and having an end wall directed radially inward of the tube axis toward the tube. A straight hard metal needle in the bore has a pointed inner end directed radially inward of the tube axis at the tube and an opposite outer end confronting the end wall of the bore. The outer needle end is centered by appropriate formations in the bore on the passage axis and the outer needle end is braced radially outward of the tube axis against the bore end wall.

10 Claims, 4 Drawing Sheets

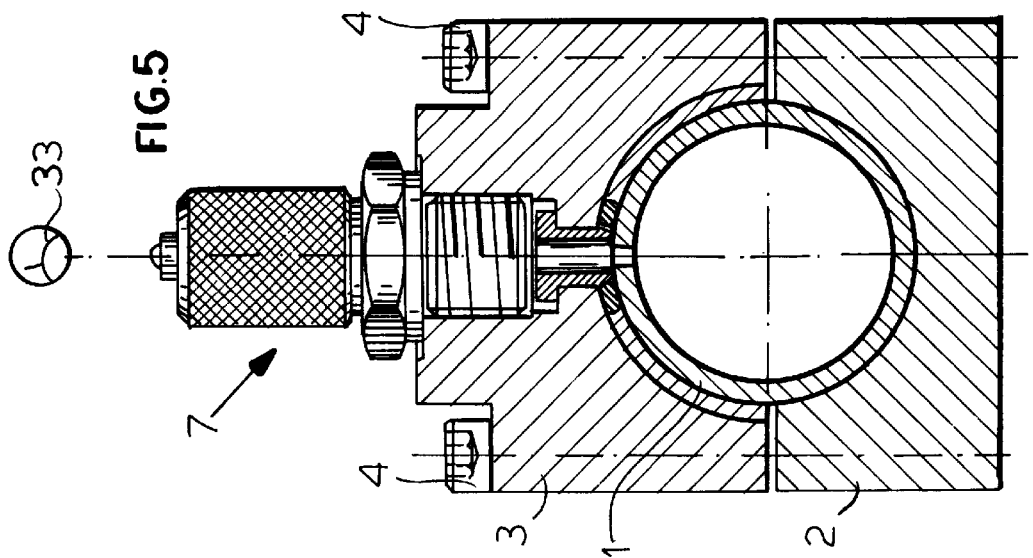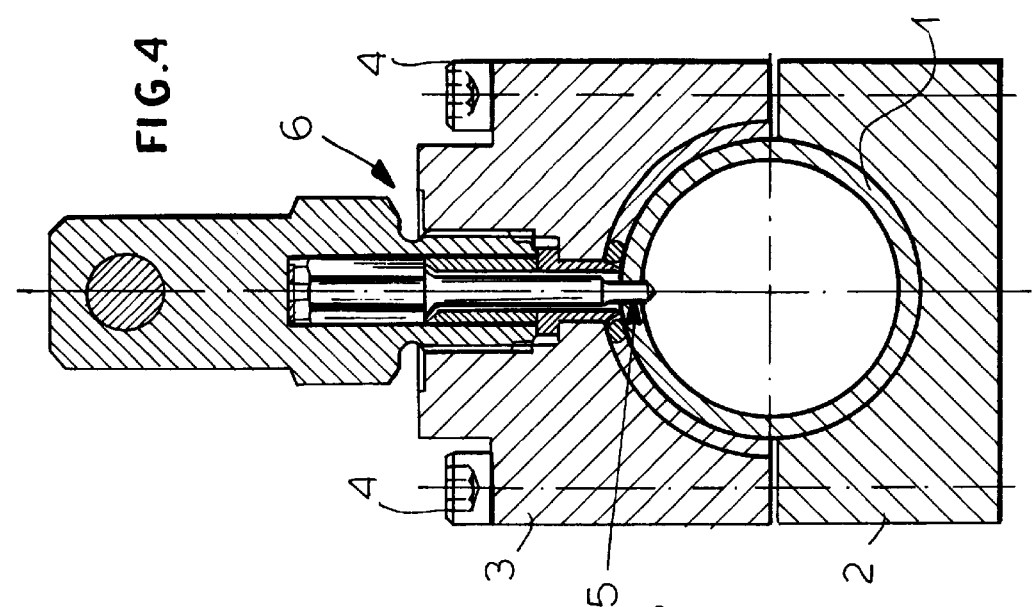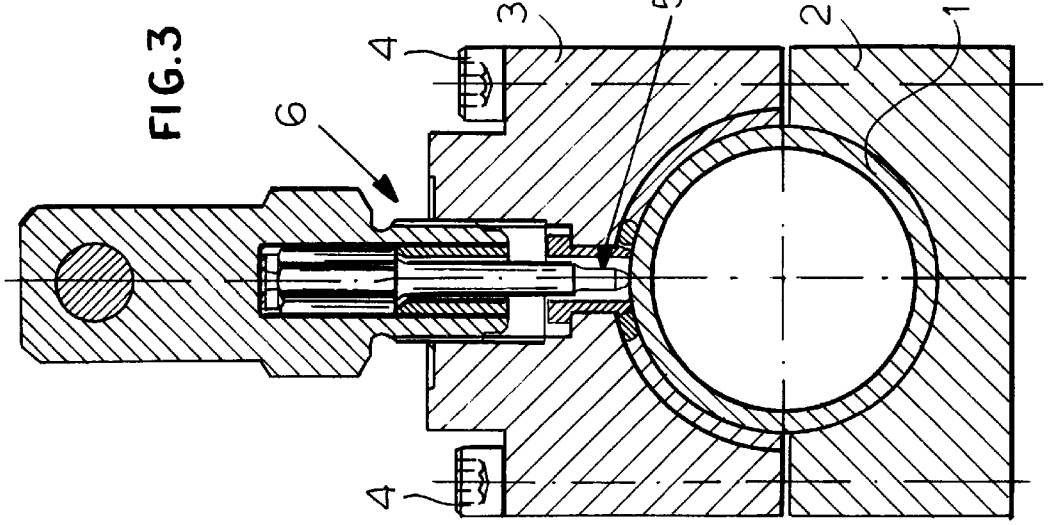

TUBING PIERCING AND TAPPING APPARATUS

FIELD OF THE INVENTION

The present invention relates to an apparatus for piercing a hole in a piece of tubing to form a tap to which a pressure meter or the like can be connected. More particularly this invention concerns such an apparatus which can even be used on a tube which is internally pressurized.

BACKGROUND OF THE INVENTION

It is frequently necessary to tap a line in order, for example, to install pressure-measuring or -monitoring equipment. Accordingly piercing saddle valves are known, for example from U.S. Pat. No. 3,198,206. Such a valve has a two-part saddle-type housing that is clamped around the tube to be tapped. One of the housing parts is formed with a threaded bore and a spindle arrangement can be screwed into this bore to force a hardened steel pin or needle through the wall of the tube, creating a radially throughgoing hole therein. After piercing the hole the needle is backed off to allow fluid flow through the hole to a meter or other load, and the needle is often also used as a valve body to control fluid flow through the hole.

A problem with such a system is that when the tubing is not of a highly malleable metal, such as copper, the needle can break. Such breakage is typically the result of the needle being bent or angled as it is forced into the tubing, causing it to flex and bend.

OBJECTS OF THE INVENTION

It is therefore an object of the present invention to provide an improved apparatus for piercing and tapping a fluid-carrying tube.

Another object is the provision of such an improved apparatus for piercing and tapping a fluid-carrying tube which overcomes the above-given disadvantages, that is which is of simple construction but that can be counted on to pierce a hole even in a steel tube without difficulty.

SUMMARY OF THE INVENTION

An apparatus for piercing a hole in a tube centered on a tube axis has according to the invention a plurality of housing parts one which is formed with a throughgoing threaded passage centered on a passage axis and both of which are secured the housing parts around the tube with the passage axis extending generally radially of the tube axis. A tool body threadable into the passage is formed with a blind bore generally centered on the passage axis, open radially inward of the tube axis toward the tube, and having an end wall directed radially inward of the tube axis toward the tube. A straight hard metal needle in the bore has a pointed inner end directed radially inward of the tube axis at the tube and an opposite outer end confronting the end wall of the bore. The outer needle end is centered by appropriate formations in the bore on the passage axis and the outer needle end is braced radially outward of the tube axis against the bore end wall.

The needle does not fit snugly in the bore. This loose fit ensures that it can be centered on the passage axis so that, as the body is screwed in, the needle stays perfectly centered and can be counted on not to bend even when forced through the wall of a very hard tube. It is a relatively easy manner to form the apparatus body with an accurate blind bore and to provide an accurately dimensioned needle so that, as the body is turned, the automatic centering ensures that no lateral forces are effective on the needle to bend it.

According to the invention the bore end wall is curved and symmetrical to the passage axis. The centering unit includes a pair of annular spring washers. The needle has an outside surface of a shape different from an inside surface of the bore so that passages extending parallel to the passage axis are formed between the needle outer surface and bore inside surface. More particularly the needle has adjacent its inner end an inner portion and adjacent its outer end an outer portion of substantially larger cross-sectional size. The body includes at least one normally plastic liner sleeve engaged around the inner portion and forming therewith a passage extending parallel to the passage axis. The needle outer end is formed with a crosswise slot open toward the bore end wall.

The system of this invention can be set up as a simple piercing tool, where the body and needle are taken off the housing after the hole is pierced and are replaced with a metering device that is screwed in toe the passage. Alternately the body and needle can stay in place. In this case the body is formed with a pilot hole connectable to the metering device and opening into the bore at the bore end wall.

The one housing part in accordance with the invention includes a half-cylindrical shell fitting directly around the tube and formed in line with the passage with an orifice having an edge. The one housing part has a guide sleeve with an inner end engaging through the orifice and engaging an outer surface of the tube. A seal ring is compressed radially of the tube axis between the body and the outer tube surface and radially of the passage axis between the inner sleeve and the orifice edge. The orifice edge is frustoconical and formed by a conical family of lines passing through an intersection of the passage and tube axes.

According to another feature of the invention the bore end wall is inwardly concave and the needle outer end is outwardly concave and the centering unit is a ball. The needle is formed of hardened steel and the housing parts are formed of malleable steel.

BRIEF DESCRIPTION OF THE DRAWING

The above and other objects, features, and advantages will become more readily apparent from the following description, reference being made to the accompanying drawing in which:

FIGS. 3, 4, and 5 are small-scale sections like FIG. 1 showing the apparatus in succeeding stages of use;

SPECIFIC DESCRIPTION

Figure 1:
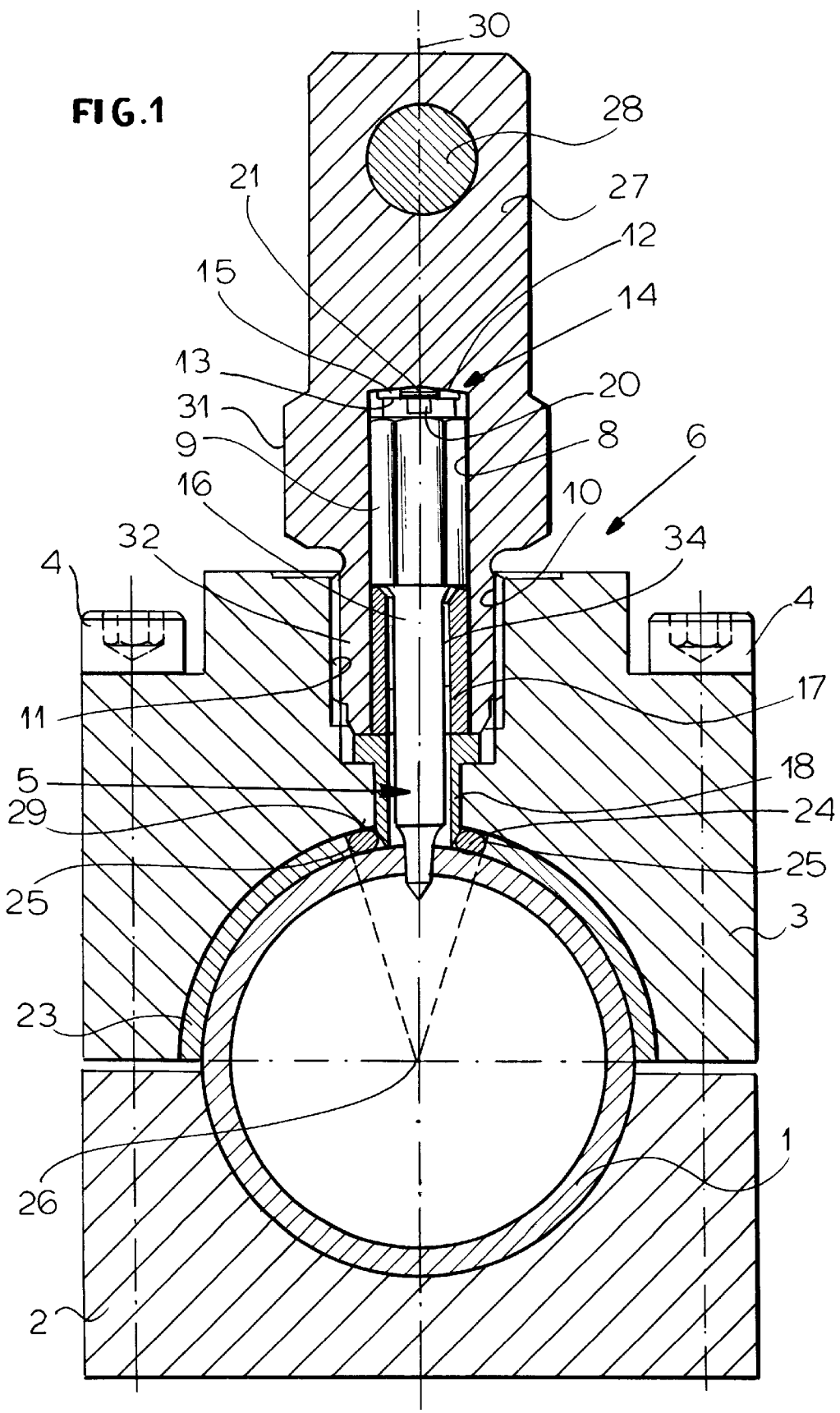
FIG. 1 is a cross section through a tube and piercing/tapping apparatus according to the invention.

As seen in FIG. 1 a cylindrical steel tube 1 centered on an axis 26 is secured between a pair of saddle-like housing parts 2 and 3 that are clamped together by bolts 4 to tightly surround the tube 1, with a semicylindrical shell 23 interposed between the upper part 3 and the tube 1. The upper part 3 is formed with a stepped threaded passage 11 centered on an axis 30 perpendicular to the axis 26 and formed with an internal screw-thread 10. The shell half 23 is formed in line with the bore axis 30 with a large-diameter hole 29 having an edge or periphery 25 lying on radii from a point where the axes 26 and 30 meet.

Figure 2:
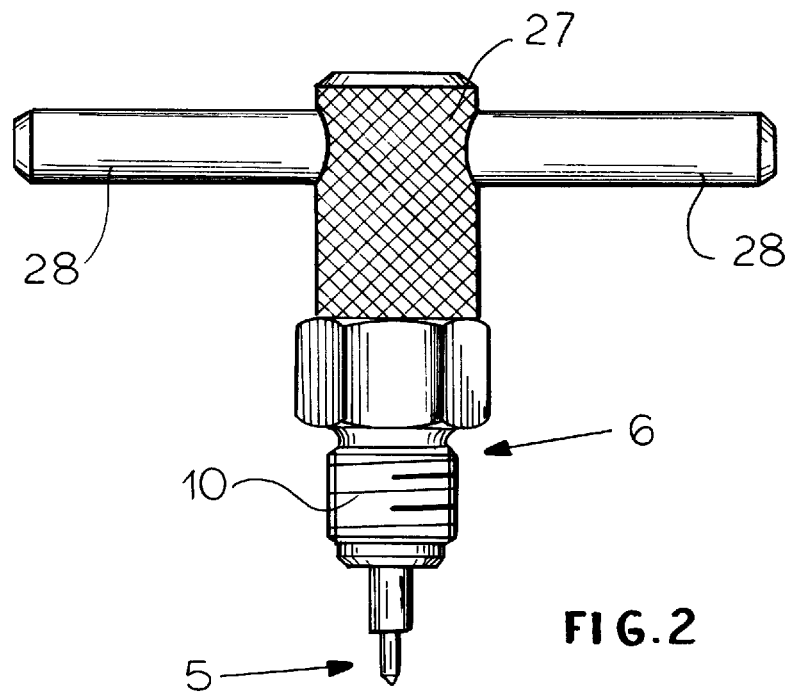
FIG. 2 is a side view of the piercing subassembly of the apparatus.

A piercing tool 6 (see also FIG. 2) has a body 27 with an externally threaded inner end 32 that fits complementarily in the passage 11 and is formed centered on the axis 30 with a cylindrical blind bore 9 having an inwardly concave or dished floor or end wall 12. A cross bar 28 extending perpendicularly through the body 27 allows it to be rotated manually with considerable torque. The body 27 is faceted at 31 so it can also be turned with a wrench if desired.

Figure 8:
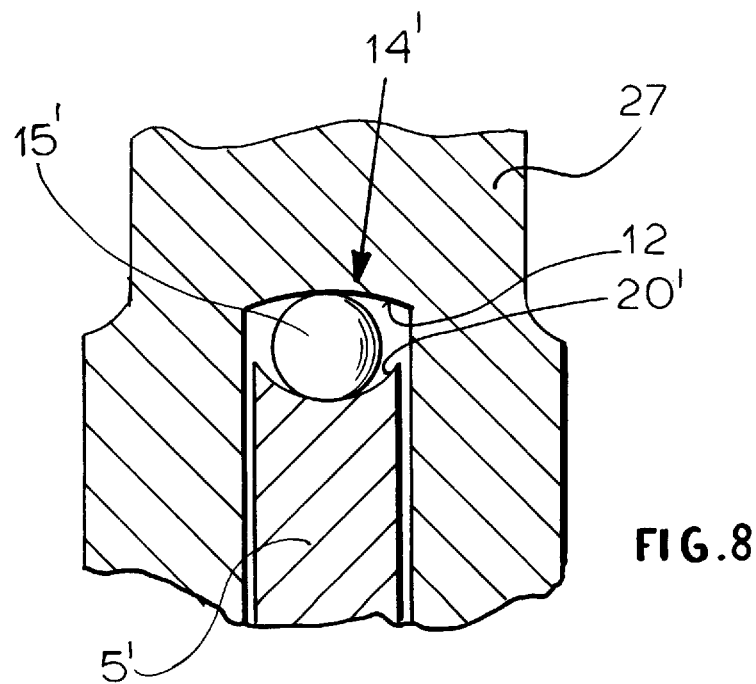
FIG. 8 is a large-scale sectional view of a detail of another system according to the invention.

A hardened steel needle 5 has a outer end 13, a large-diameter faceted outer end portion 9, a medium-diameter inner portion 16, and a pointed inner end 19, all normally centered on the axis 30. This needle 5 can move limitedly axially in the bore 8. Its inner portion 16 passes axially through a plastic guide sleeve 17 formed with radially inwardly directed ribs 34 and passes loosely through a tubular and T-shaped guide sleeve 18 that extends right up to the outer wall of the tube 1. An O-ring 24 is provided between the outer surface of the inner end of the sleeve 18 and the hole edge 25. The outer end 13 of the needle 5 is formed with a diametrally crosswise slot 20 and bears via a centering system 14 here constituted by a pair of centering spring washers 15 on the end wall 12 of the bore 8. In FIG. 8 a needle 5' has an outer end 20' that is outwardly concave and a centering arrangement 14' is provided constituted by a ball 15'.

The loose fit of the portion 16 in the sleeve 18, the channels formed between the ribs 34 (or between grooves in the portion 16 or sleeve 17 provided instead of the ribs 34), the spaces formed between the polygonally faceted portion 8 and the cylindrical bore 8, holes 21 in the spring rings 15, and the slot 20 ensure fluid flow the length of the bore 8 past the needle 5.

The device is used as follows:

First the housing 2, 3, 4 is assembled around the tube 1 with the O-ring 24 tightly compressed between the part 3 and tube 1. This places the parts in the FIG. 3 position.

The piercing assembly 6 is then forcibly screwed into the bore 11. As it moves inward along the axis 30 the needle 5 is centered on the axis 30 by the washers 15 and the tip 19 is forced through the wall of the tube 1 into the FIG. 4 position.

Finally as indicated in FIG. 5 the tool 6 is removed, with of course the tube 1 depressurized, and is replaced with a fitting 7 connected to a meter 33.

Figure 7:
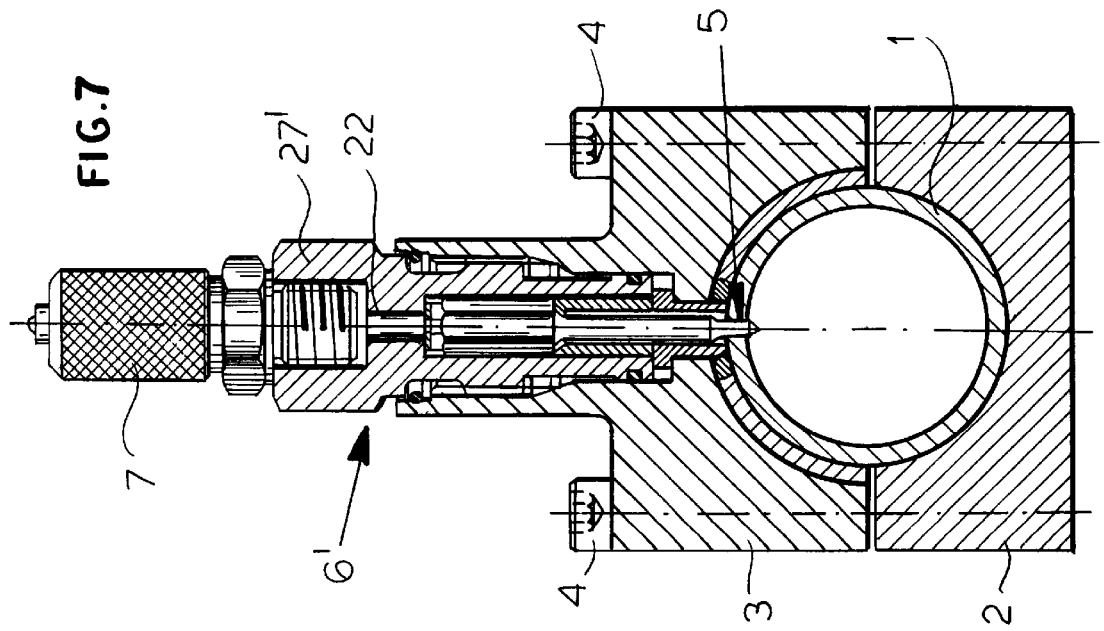
FIGS. 6 and 7 are small-scale sections like FIG. 1 showing another apparatus according to the invention.
Figure 6:
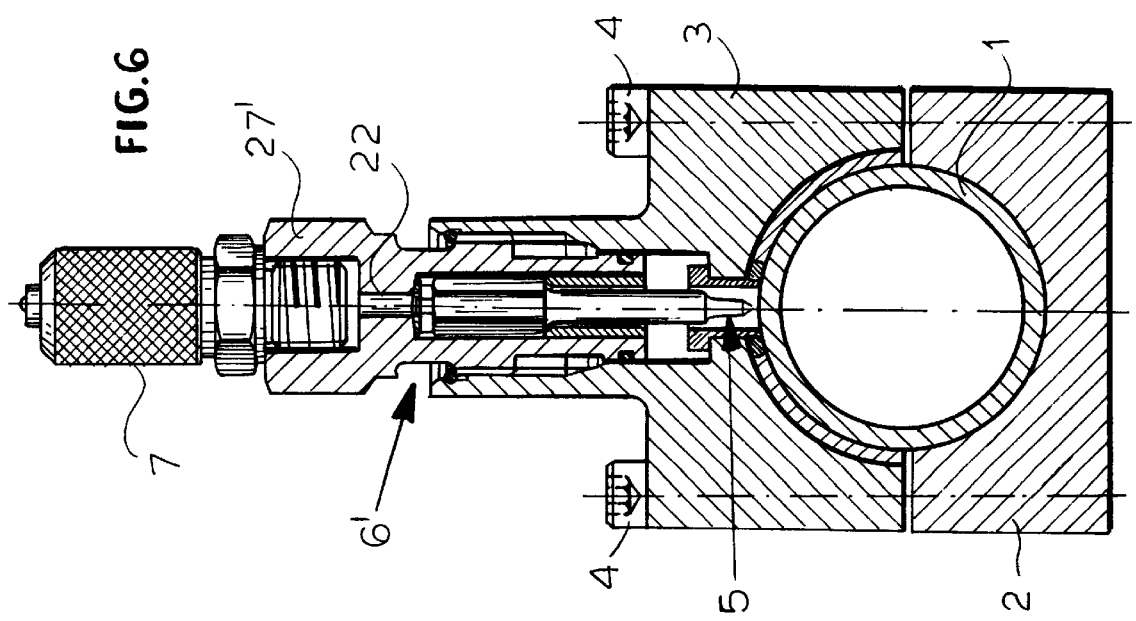

FIGS. 6 and 7 show an arrangement in the position of FIGS. 3 and 4 where, however, the tool 6' has a body formed with a small-diameter pilot passage 22 aligned with the axis 30 and of a cross-sectional size much smaller than that of the needle 5. The meter fitting 7 is screwed to the top of the tool 6' which is backed off to allow flow out of the tube 1 past the needle 5.

I claim:

1. An apparatus for piercing a hole in a tube centered on a tube axis, the apparatus comprising:

a plurality of housing parts one which is formed with a throughgoing threaded passage centered on a passage axis;

means for securing the housing parts around the tube with the passage axis extending generally radially of the tube axis;

a tool body threadable into the passage and formed with a blind bore generally centered on the passage axis, open radially inward of the tube axis toward the tube, and having an end wall directed radially inward of the tube axis toward the tube;

a straight hard metal needle in the bore and having a pointed inner end directed radially inward of the tube axis at the tube and an opposite outer end confronting the end wall of the bore; and means for centering the outer needle end in the bore on the passage axis and for bracing the outer needle end radially outward of the tube axis against the bore end wall, thereby aligning the needle with the passage axis.

2. The tube-piercing apparatus defined in claim 1 wherein the bore end wall is curved and symmetrical to the passage axis, the centering means including a pair of annular spring washers.

3. The tube-piercing apparatus defined in claim 1 wherein the needle has an outside surface of a shape different from an inside surface of the bore, whereby passages extending parallel to the passage axis are formed between the needle outer surface and bore inside surface.

4. The tube-piercing apparatus defined in claim 3 wherein the needle has adjacent its inner end an inner portion and adjacent its outer end an outer portion of substantially larger cross-sectional size, the body including at least one liner sleeve engaged around the inner portion and forming therewith a passage extending parallel to the passage axis.

5. The tube-piercing apparatus defined in claim 1 wherein the needle outer end is formed with a crosswise slot open toward the bore end wall.

6. The tube-piercing apparatus defined in claim 1 wherein the body is formed with a pilot hole connectable to a metering device and opening into the bore at the bore end wall.

7. The tube-piercing apparatus defined in claim 1 wherein the one housing part includes a half-cylindrical shell fitting directly around the tube and formed in line with the passage with an orifice having an edge, the one housing part having a guide sleeve with an inner end engaging through the orifice and engaging an outer surface of the tube, the apparatus further comprising a seal ring compressed between the body and the outer tube surface and between the inner sleeve and the orifice edge.

8. The tube-piercing apparatus defined in claim 7 wherein the orifice edge is frustoconical and formed by a family of lines passing through an intersection of the passage and tube axes.

9. The tube-piercing apparatus defined in claim 1 wherein the bore end wall is inwardly concave and the needle outer end is outwardly concave and the centering means is a ball.

10. The tube-piercing apparatus defined in claim 1 wherein the needle is formed of hardened steel and the housing parts are formed of malleable steel.

* * * * *